(12) United States Patent
Dalmazzo (10) Patent No.: US 11,436,666 B1
(45) Date of Patent: Sep. 6, 2022

(54) AUGMENTED REALITY MENU

(71) Applicant: Enzo Dalmazzo, Miami Beach, FL (US)

(72) Inventor: Enzo Dalmazzo, Miami Beach, FL (US)

(*) Notice: Subject to any disclaimer, the term of this patent is extended or adjusted under 35 U.S.C. 154(b) by 0 days.

(21) Appl. No.: 17/530,412

(22) Filed: Nov. 18, 2021

(51) Int. Cl.
| | |
|---|---|
| *G06V 20/20* | (2022.01) |
| *G06Q 30/06* | (2012.01) |
| *G06T 19/00* | (2011.01) |
| *G01S 17/89* | (2020.01) |
| *G06Q 50/12* | (2012.01) |

(52) U.S. Cl.
CPC .......... *G06Q 30/0643* (2013.01); *G01S 17/89* (2013.01); *G06Q 30/0633* (2013.01); *G06Q 50/12* (2013.01); *G06T 19/006* (2013.01); *G06V 20/20* (2022.01)

(58) Field of Classification Search
CPC ........... G06Q 30/0643; G06Q 30/0633; G06Q 50/12; G06V 20/20; G01S 17/89; G06T 19/006
See application file for complete search history.

(56) References Cited

U.S. PATENT DOCUMENTS

| | | | | |
|---|---|---|---|---|
| 9,165,398 B2* | 10/2015 | Kim | ....................... | G16H 30/20 |
| 9,529,385 B2* | 12/2016 | Connor | ............. | G09B 19/0092 |
| 9,959,628 B2* | 5/2018 | Mutti | ................... | G06V 20/653 |
| 2010/0097445 A1* | 4/2010 | Hirama | .................. | G06Q 30/00 348/51 |
| 2020/0311144 A1* | 10/2020 | Sandhu | ............... | G06F 16/9038 |

* cited by examiner

*Primary Examiner* — Gregory M Desire
(74) *Attorney, Agent, or Firm* — Christopher J. VanDam, P.A.; Chris J. Van Dam (57) ABSTRACT

An augmented reality viewing system that aids a patron in visualizing a prepared food dish. The restaurant prepares ahead of time three-dimensional images of available food dishes. The patron, using their portable electronic device, images the table at which they plan on having their meal. Any selected dish can then be superimposed onto the image of the actual table so the patron can view, through augmented reality, what they can anticipate when the dish is delivered to the table.

6 Claims, 5 Drawing Sheets

AUGMENTED REALITY MENU

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to providing dynamic information to a restaurant patron about the menu, and more particularly, to an improved device and method of use to demonstrate a particular restaurant dish superimposed over the actual dining experience by utilizing augmented reality.

2. Description of Related Art Including Information Disclosed Under 37 CFR 1.97 and 37 CFR 1.98

Several designs for digital menus have been created in the past. None of them, however, include and augmented reality feature to view of an image of prepared menu items combined with an actual view of the table from the perspective of the patron.

Applicant believes that the closest prior art designs correspond to electronic menus that list items available at a restaurant. Generally, these are an alternative to a traditional paper menu. Some of these traditional paper menus also include a static image of an example of the dish. However, the present device differs from all prior art because the patron reading the menu can select a dish and view a virtual 3D rendering of the dish, using augmented reality, placed on the table in front of them with the actual true background and surroundings also visible.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main objects of the present invention to provide an augmented reality viewing experience custom tailored to the dining menu experience.

It is another object of this invention to provide a realistic demonstration of how a particular dish may look during the menu consideration process before a meal.

It is yet another object of the present invention to improve the social experience between multiple patrons of a restaurant at a table by sharing individual experiences at a table to others in the party through augmented reality viewing and a social interaction.

It is yet another object of this invention to provide such a device and method of use that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention exists in the details of construction and combination of parts as will be more fully understood from the following description, when read in conjunction with the accompanying drawings in which.

DETAILED DESCRIPTION OF THE INVENTION

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the augmented reality menu, the menu, the augmented reality system, the personal electronic device, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

At a restaurant or at home a consumer reviews a physical or digital menu on their phone to order food. The consumer is given an opportunity to visually predict what their meal will look like. Some menus have pictures, but rarely do picture exist for every item on the menu. Menus can be over-descriptive, under-descriptive, have lavish wording, or even be in a different language.

This menu complexity and a consumer's visual guessing potentially leads to unhappy consumers receiving food they didn't desire and restaurants losing money due to meal rejections. What is needed is a better way to present a menu and improve the food ordering experience for all consumers globally.

With the recent adoption of Augmented Reality (AR) technology into mobile phones and related operating systems, the food ordering experience can be optimized to benefit both restaurant owner and consumer alike. The hardware and software will allow restaurant owners the ability to digitize their menus for mobile phone usage. Using the software and existing hardware available on smart phones, restaurant owners can create a 3D model of every dish on their menu and load the model to the matching item on their digital menu. Now the end consumer can use their AR ready smart phone to virtually view their meal thru their phone camera on the table In front of them.

Additional optional features may be added to enhance the consumers' food ordering experience. A dish rating system may optionally be added to the AR viewing screen. This will allow consumers to make a more informed decision during meal selection. The rating system will display the average rating for the dish and allow user to read reviews for the dish.

While it is common for restaurants to have reviews, individual dish reviews have not been available. The dish review will further enhance the food ordering experience. Other features that can be added to the AR viewing screen, possible allergies, how spicy the meal is, calorie intake, vegan, vegetarian, gluten free, raw food disclosure and restaurant promotions. These can be available in a detail selection button near the menu entry.

Additional features may also be available to further maximize the food ordering experience. Seeing the meals being viewed by other users at your table enhances the social experience. Selecting and ordering the food from the same app reduces waitress workload. Paying for your meal using the same app speeds the transaction. A full turnkey ordering system is possible where few or no waiters are required, only bus boys to bring out the food.

Referring now to the drawings, where the present invention is generally referred to with numeral 10, it can be observed that it basically includes a mobile device 12, a table 14, a guest 16, a plate 18, a plate 20, a scan code 22, a silverware 24, a chair 26, a decoration 28, a corner 30, a button 32, a screen 34, a food 36, a menu screen 38, buttons 40, menu items 42, a button 44, buttons 46, a menu item 48, a nutritional info 50, a detail button 52, an augmented view button 54, a place order button 56, a surface 70, a turntable 72, a plate 74, food 76 and an imaging device 78.

Figure 1:
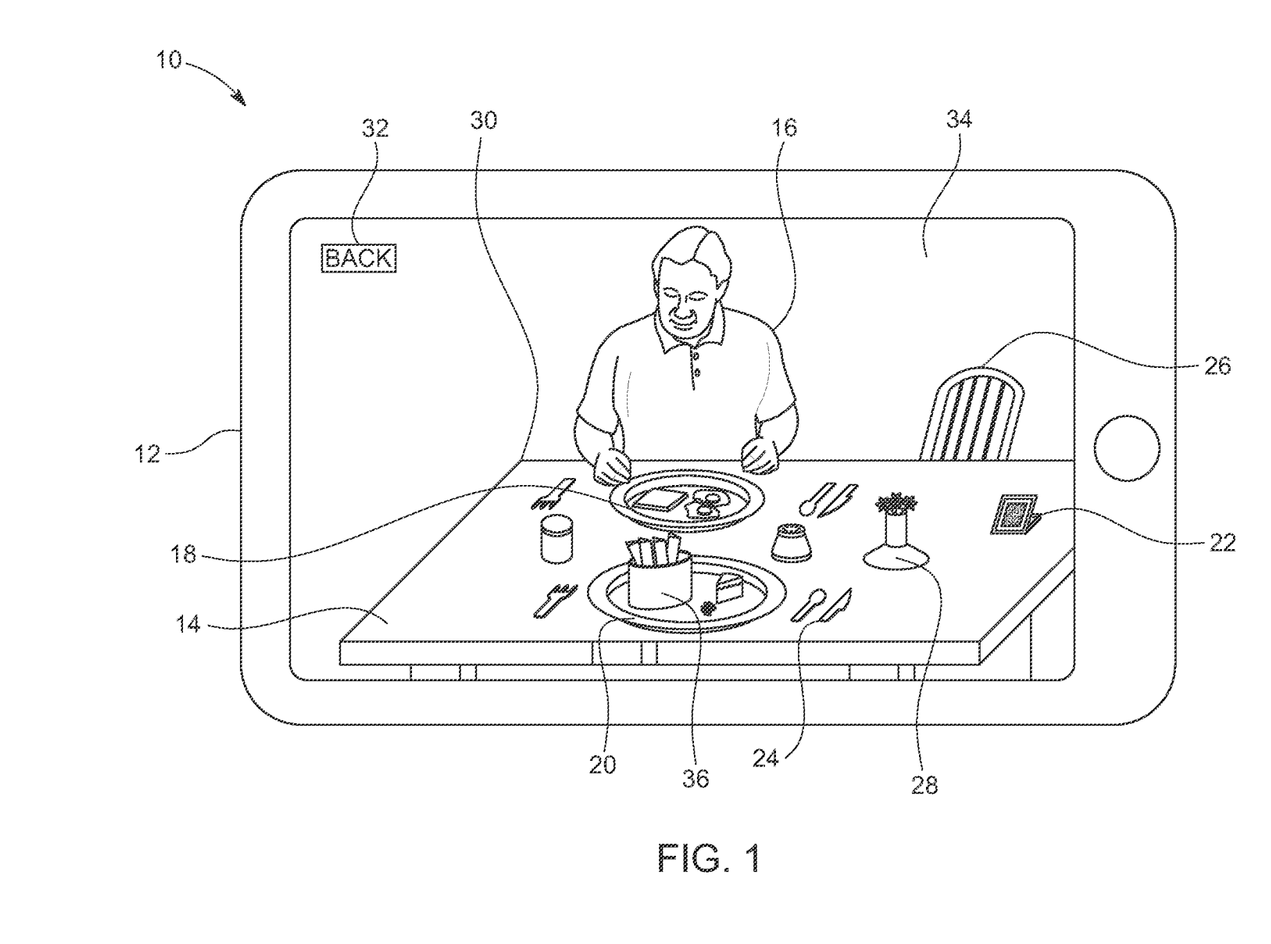
FIG. 1 shows an elevation view of a portable electronic device demonstrating an augmented reality view.

FIG. 1 shows an example of a screen 34 of a mobile device 12. The screen 34 is facing the user of the mobile device 12. A camera on the side of the mobile device 12 opposite the screen 34 is directed toward the table 14 in front of the user.

Through the camera the user can see on the screen 34 items that are actually on the table, such as the flower decoration 28 and silverware 24. Another guest 16 sitting across the table 14 from the user may also be visible on the screen 34 through use of the camera integral to the mobile device 12.

Instead of, or in addition to, the camera, lidar may be implemented by the mobile device 12. Lidar is generally "light detection and ranging" or "laser imaging, detection, and ranging". Lidar sometimes is called 3-D laser scanning, a special combination of 3-D scanning and laser scanning. Lasers and backscatter receiving sensors in the mobile device 12 can image the table and dishes in great detail in addition to range finding with time of flight (ToF) calculations made in the mobile device 12.

By means of augmented reality, the mobile device 12 superimposes and example of the plate 20 including a selected food 36 item. The food 36 is selected by the user of the mobile device 12 through the software application.

Augmented reality systems can detect a surface, such as the table in front of the patron, by detecting one or more surface points to map the plane of the surface. These surface points are tracked over time to maintain awareness of the surface position. This allows the augmented reality system to consistently place the imaged plate of food in the correct location. The system may also allow a user to manually select the location of the plate of food in the augmented reality frame of view where it looks appropriate.

It should be appreciated that the terms surface points and reference points are interchangeable and can equally be used to define a position of a surface or object in an augmented reality system. There may be a single point or multiple surface or reference points to define the location, relative location of the elements and aid in tracking as the reference frame moves.

Surface detection in augmented reality (AR) contributes to the functioning of the system by aiding in motion tracking, environmental understanding and light estimation. Motion tracking technology is a way to live view the 3D elements that appear to inhabit the real world using the camera of a device. A camera identifies surface points, called features, and tracks those points to move over time. For environmental understanding, AR allows the device to capture plane surfaces like a ground, flat table, etc., and place 3D objects in a way that it merges broadloom with the real world. Light estimation estimates the average lighting in the captured flat area for showing a proper model with lightning and shading.

The augmented reality software automatically aligns the image on the screen 34 by use of visible markers. These markers or visual cues could be an object such as the scan code 22 or by visually observing the corner 30 of the table 14. The system is then able to determine the perspective and also the location of where the user's plate 20 should be visually located and is virtually placed on the table using augmented reality overlay to the camera image.

Additionally, if there is one or more additional people at the table 14, the plate 18 of another guest 16 (or guests) may be located on the screen 34 in front of the camera image of that guest 16. A plate 18 of food that that other guest 16 has ordered, or is considering ordering, may appear by augmented reality overlay on the screen of the user.

By providing the user the ability to view the food choices or food considerations of another guest 16, the device may encourage social interaction to discuss or comment on another guest's selection. If other guests 16 have access to the augmented reality menu system they may equally use their mobile device to view the original user, their plate 20 of food 36, as well as those of other guests around the table.

The augmented reality menu may be initialized when the user scans a code 22 to link over the network to the menu at the restaurant in which they are sitting. Similarly, the system it may geo-locate the mobile device 12 to automatically identify and select the restaurant. Alternatively, the user may manually log into the system and direct the server and software to display the appropriate menu by selecting the particular restaurant by name or location.

In one version of the device and system, the camera image is not derived from the camera in the mobile device 12. In this case, the restaurant provides a stock image of an exemplary table 14 with surroundings in of the restaurant. The user may then identify specific food items on the menu and view them how they would look when the user arrives at the table 14 at the restaurant. This can be done for multiple guests in one party before arriving at the restaurant or after arrival to decide particular dishes and showcased their selections to others in the party.

In another version of the device and system, the camera image is not taken at the restaurant preparing the food, but instead is a remote location where the user intends to consume the meal. For example, this could be their own dining room table or a picnic table in the park. As in other examples described herein, the virtual dish as may be superimposed on the actual table upon which the user anticipates consuming the meal through augmented reality.

In some instances the representative photograph of the table 14, as opposed to using the camera on the reverse of the mobile device 12, may be used when the guests are waiting for a table to be prepared. Instead of waiting idly in the restaurant's reception area, the guests can review the menu and begin the food selection process before actually being seated at the table.

Figure 4:
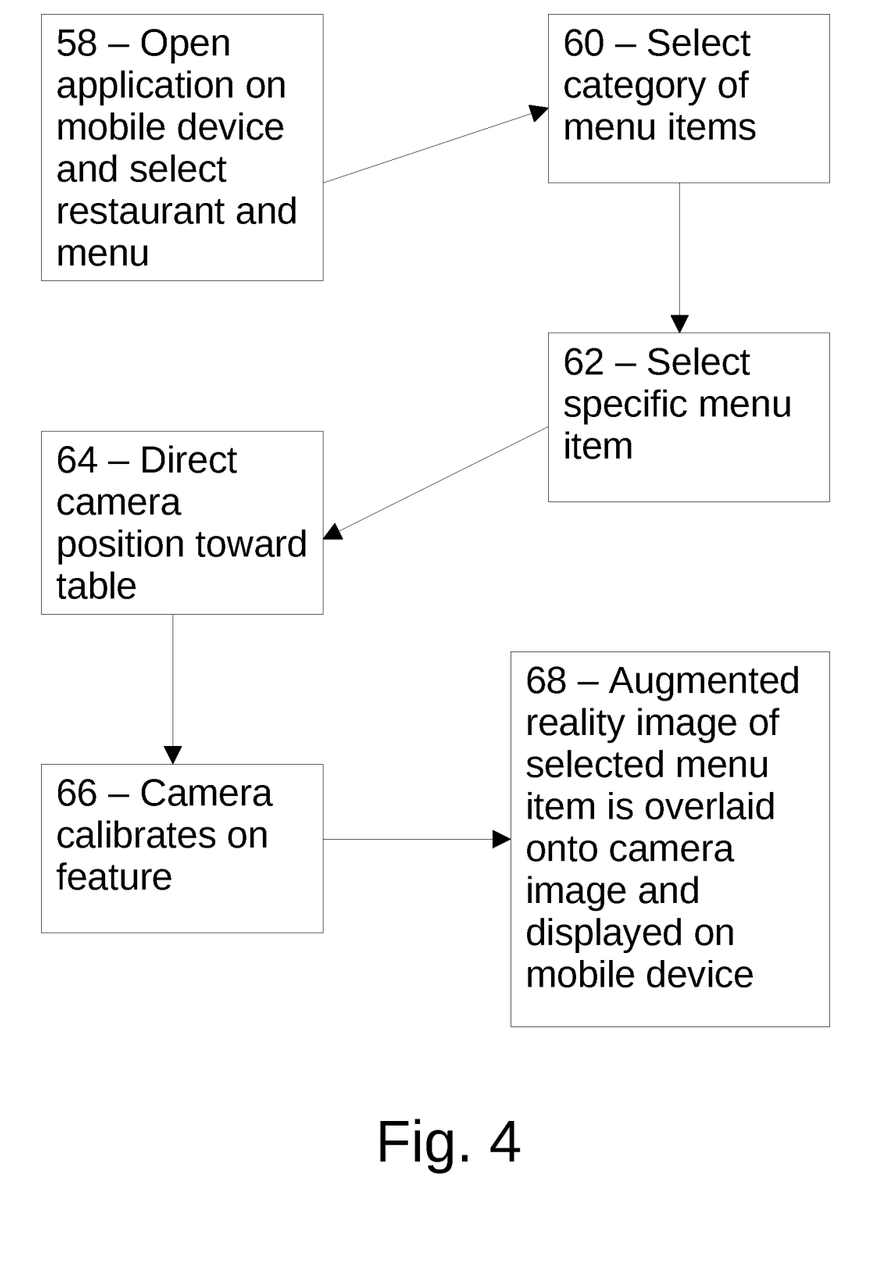
FIG. 4 shows a flowchart of an example of the processes involved in the augmented reality menu.

FIG. 4 shows an example of the process of the augmented reality menu. The software process is initiated on a mobile device. It should be appreciated that a mobile device includes portable electronic hardware and software that is commonly carried by people. These may include tablets, smart phones, wearables or other devices that include both a camera and a display with network connected ability and sufficient processing power to process the augmented reality images.

Once the application is opened, in step 58 the specific menu for the identified restaurant is selected. The particular restaurant can be identified from scanning a scan code 22, manually selected through the application or derived from the GPS location of the mobile device 12. The user may automatically be directed to a standard menu or alternatively, sub-menus may be selectively available to the user. These may include, for example, a dinner or lunch menu, specials, a wine list or other restaurant-generated sub-menus.

Figure 2:
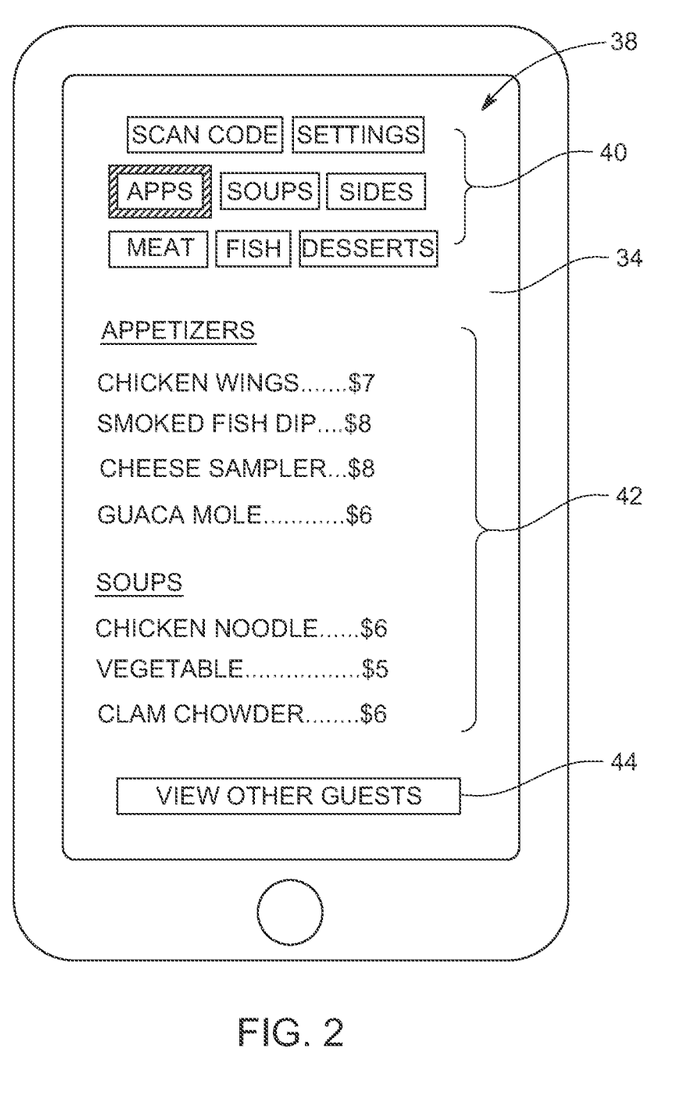
FIG. 2 shows an elevation view of a portable electronic device.

In step 60 on FIG. 4, and as shown generally in FIG. 2, the user can filter or narrow down the menu items 42 displayed. In this example, the user has selected the sub-category appetizers by touching the appropriate button 40 on the menu screen 38. The appetizers menu items 42 are presented to the user. The user is free to navigate between categories by use of the buttons 40 and by scrawling up or down through the menu items 42.

Figure 3:
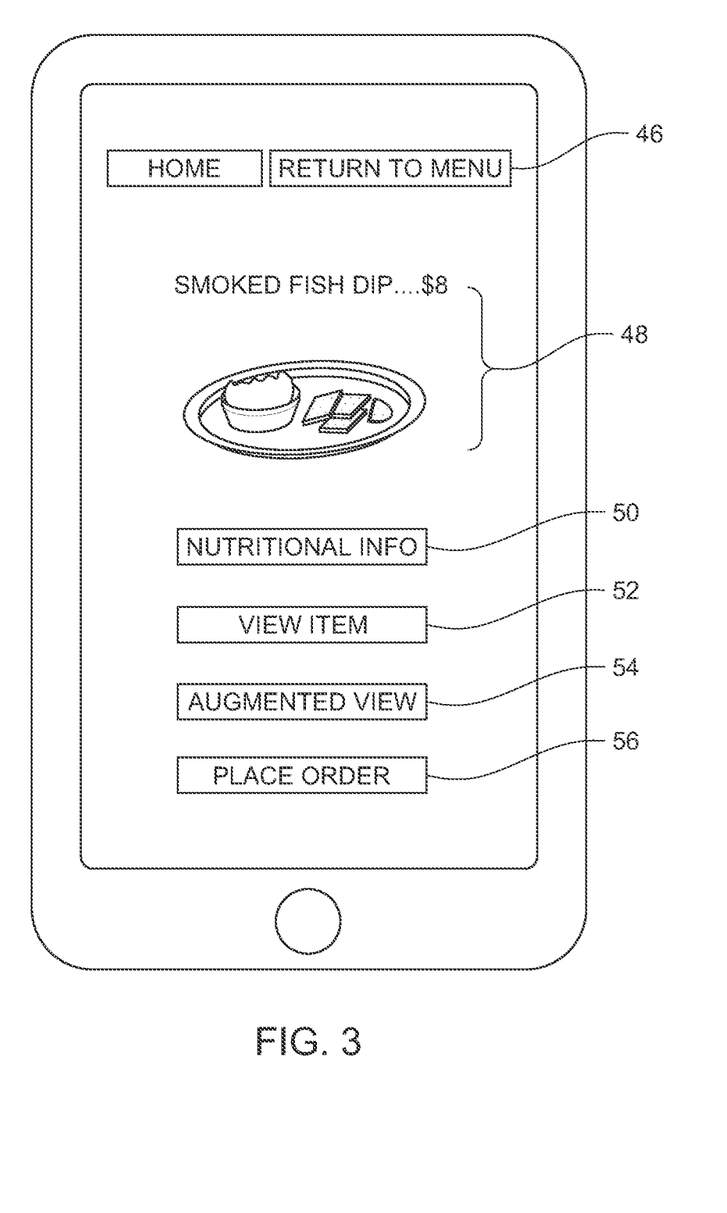
FIG. 3 shows an elevation view of a portable electronic device.

In step 62 on the chart of FIG. 4, the user selects a specific menu item. An example of the display arm the mobile device is shown in FIG. 3. In this example, the user has selected a menu item 48, a smoked fish dip. A static or three-dimensional image of the menu item 48 may be provided here on the menu as well as overlaid onto the table. Optionally, nutritional information may be shown in detail by selecting the nutritional information button 50. A detail button 52 may also be provided to show the user additional information about the item. For example, ingredients, language translation or a narration of the menu item may be available.

In step 64 on FIG. 4 the user directs the camera on the mobile device 12 toward the table 14. In step 66, the augmented reality menu system calibrates the direction of the camera with a known reference point or multiple reference points. For example, a fixed scan code 22 may be used to orient the camera to overlay augmented reality images in the correct position on the table 14. Similarly, known items, such as the table or objects on the table may be used as reference points.

Artificial intelligence may also be combined with the augmented reality. Artificial intelligence may use other cues in the image from the camera of the mobile device 12 to ascertain the perspective of the camera. For example, through artificial intelligence the surface of the table 14 can be identified from a visible corner 30 of the table 14, from the position of other guest 16 and chairs 26 or from any other environmental cues visible through the camera of the mobile device 12.

Another example of obtaining correct positioning of the virtual dish and actual table may include artificial intelligence identifying multiple reference points. Using time of flight (ToF) range finding integral to the lidar laser imaging the table, items on or near the table and people may be identified, imaged and located on the augmented reality image.

Once the camera orientation is calibrated and the menu item is selected, the user may enter the augmented view mode by selecting the augmented view button 54. An image will be displayed on the screen 34 of the mobile device 12, similar to that shown in FIG. 1. In this example in FIG. 1, the plate 18 and plate 20 are not physically on the table. The table 14 and guest 16 are present and the plate 18 and plate 20 are displayed virtually on the surface of the table 14. Food 36 that has been selected from the menu items 42 is shown on the plate 20 and a representative view simulating what the user should expect to see when the food is delivered to the table 14.

If the user is satisfied as to the menu item 48, a place order button 56 is available to directly order the menu item 48. Once prepared, the menu item 48 is delivered to the user's table 14. By allowing the place order button 56 to cause the food item to be made and delivered to the user, the necessity of a waitress to explain menu items and take the order is reduced. This can be a labor and cost savings to the restaurant. At the same time, the user is provided a greater amount of accurate information about the nutritional information, appearance of the plate 20 of food 36 and other details about the menu items.

An operator of the restaurant establishes a database comprised of nutritional information, menu item details and images of each of the menu items available four display through the augmented reality menu. A restaurant may have to make and photograph a wide variety of menu items and plate configurations to ensure that the selected virtual plate of food is available for superimposing on the augmented reality image displayed on the screen 34.

Each of the images of food items on the menu may be captured in a three-dimensional format. When the example dish of food is prepared, a series of cameras or a rotating turntable may be placed under the plate to capture the image of the food from all angles. The user may be able to then rotate and view the particular menu item in isolation or through the augmented reality viewer on a table.

Figure 5:
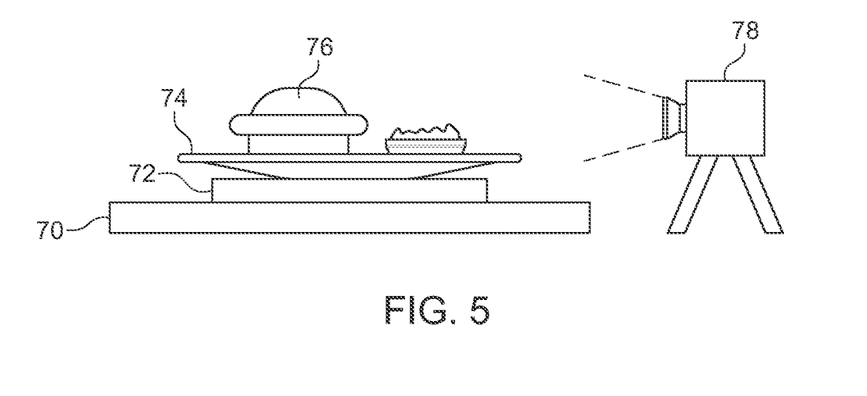
FIG. 5 shows a perspective view of a plate of food in the 3D imaging process.

FIG. 5 shows an example of 3D imaging a plate 74 of food 76. The imaging device 78 is positioned in proximity to the food 76. A turntable 72 is placed on a surface 70. The plate 74 with the food 76 is rotated so the imaging device 78 can image all sides of the food 76. The imaging device 78 may be a lidar-based device, an optical camera or any other technology to capture a 3D image of the food 76. There may be multiple imaging devices 78 of the same technology or different technology. The turntable 72 is optional.

In one version of the invention, lidar is used to capture the image of the plate of food, alone or in combination with optical imaging. With advanced imaging a series of images may be digitally stitched together from several images and/or combinations of imaging technology. This may include an image creator walking around the dish, taking multiple angles and perspective images or other 3D imaging described herein.

The system may also allow enhancements to the photographed food items. For example, steam may be added coming off of hot dishes or textured surfaces imposed on the food to more accurately represent what the user is expected to experience on the actual meal is delivered. Audio enhancements may also be possible, such as the sizzle of a hot fajita or the tinkle of ice in a cocktail glass.

One version of the device can be fairly described as a process for viewing a meal, through augmented reality, superimposed over an image of a table or other eating area from the perspective of the patron/user. Generally, a restaurant manager, chef or other person responsible for preparing the menu and images of menu items is referred to as a provider in the claims. The provider identifies one or several meals from a particular menu. Generally, a menu is a series of dishes from a particular restaurant. The provider then generates a three-dimensional image of food dishes on the menu so they appear as they might be delivered to a restaurant patron. These images made ahead of time and are stored on a server and can be accessed by the system at any time in the future, for any future patron. As the patron reviews the menu and considers which meal they may order on their mobile device, they can select a menu item meal to view in more detail. The user's mobile device generally includes an image and device such as a camera or lidar directed away from the user (toward the table) with a display on the surface facing the user. The patron directs the imaging device toward an eating location, such as a table, to obtain a primary image of the eating location. The eating location could also be the patron's home dining room table, a lunch counter, a picnic blanket or any other place where the user may want to eat their meal so they can see the possible meal in the place they are intending to ear. The mobile device identifies a reference point on the eating location to determine where the dish should be located on the primary image. Generally, this may be where the place setting would be in front of the patrons seat. These reference points may be, for example, one or more corners of the table, a QR code reference point or other means to geographically orient the eating surface through artificial intelligence. The patron's mobile device then retrieves the three-dimensional image of the dish from the server. The display on the patron's mobile device, through augmented reality, places the three-dimensional image of the prepared food, that was created by the provider in the past, over the position on the eating location (table) where the patron is likely to place the dish when the actual, in real life food would be delivered to the table for consumption. In this way, the patron can select a dish from the menu and direct the camera on their mobile device toward the table where they intend to have the meal and the previously generated image of the prepared dish is superimposed over the eating position of that user so that they can visualize what a meal would look like using augmented reality. Other dish selections could be viewed to help the user select the dish best suited to them before committing to an order. Optionally, the augmented reality viewer may include a flame image or water vapor arising from the three-dimensional image to imply that a dish is warm or flame cooked. Optionally, the three-dimensional image of the prepared food is made by the provider long before the patron enters the restaurant. The image may be derived from lidar and/or an optical camera. Optionally, a second patron may accompany the original patron and they may select a menu item with corresponding three-dimensional image and that image is placed in front of where the second patron may be sitting and visible through the personal device of the original patron from their perspective. In this way, several patrons sitting together at a table may each collaborate and view through their own personal device the location of other users and their selected dishes as they may appear from each respective users position at the table. Optionally, the process of viewing the augmented reality images may be real-time, live video-like images as the patron pans their personal device across the table using augmented reality so that the image seen on the display of the patrons device is similar to a moving view finder, where they can look at different areas of the table with each of the other patrons dishes superimposed on the image via augmented reality. In this sense, the display acts similar to a live action movie where as the camera pans and tilts the image is shown to the user in real-time with the augmented reality enhancements.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A process for augmented reality viewing a meal comprised of the steps:
    a provider identifying a meal from a menu;
    the provider preparing the meal on a dish;
    the provider generating a three dimensional image of the prepared meal on the dish;
    the provider storing the three dimensional image on a server;
    a patron browsing the menu and selecting the meal on a mobile device;
    the mobile device includes an integral imaging device and a display;
    the patron directing the imaging device towards an eating location and obtaining a primary image of the eating location;
    the mobile device identifying a reference point on primary image of the eating location and determining a location of the three dimensional image relative to the reference point in the primary image;

the mobile device retrieving the three dimensional image from the server;

the mobile device displaying on the display an augmented reality image comprised of the primary image augmented with the three dimensional image positioned at the dish location;

the patron observing on the display the augmented reality image of the three dimensional image of the meal positioned at the dish location on the eating location.

2. The process for viewing a meal in claim 1 further characterized in that a rising flame or a rising water vapor image is superimposed over the three dimensional image.

3. The process for viewing a meal in claim 1 further characterized in that the dish location of the three dimensional image relative to the eating location is derived from lidar generated by the mobile device by scanning the eating location.

4. The process for viewing a meal in claim 1 further characterized in that the three dimensional images is derived from an optical camera.

5. The process for viewing a meal in claim 1 further characterized in that the augmented reality image includes a second three dimensional image selected by a second patron and augmented onto the augmented reality image of the patron, where the second three dimensional image is positioned at a second dish location adjacent to where the second patron is seated, and where both the three dimensional and second three dimensional images are visible on the display from the perspective of the patron.

6. The process for viewing a meal in claim 1 further characterized in that: as the patron moves an orientation of the imaging device, the augmented reality image changes in real-time corresponding to the orientation of the imaging device while keeping the three dimensional image positioned at the dish location.

* * * * *